(12) United States Patent
Lee

(10) Patent No.: US 7,623,212 B2
(45) Date of Patent: Nov. 24, 2009

(54) LIQUID CRYSTAL DISPLAY DEVICE

(75) Inventor: Jae Kyun Lee, Gunpo-si (KR)

(73) Assignee: LG. Display Co., Ltd., Seoul (KR)

( * ) Notice: Subject to any disclaimer, the term of this patent is extended or adjusted under 35 U.S.C. 154(b) by 442 days.

(21) Appl. No.: 11/409,118

(22) Filed: Apr. 21, 2006

(65) Prior Publication Data
US 2006/0290860 A1  Dec. 28, 2006

(30) Foreign Application Priority Data
Jun. 28, 2005 (KR) .................. 10-2005-0056120

(51) Int. Cl.
*G02F 1/1339* (2006.01)

(52) U.S. Cl. .................. 349/156; 349/155; 349/157; 349/153; 349/160

(58) Field of Classification Search .......... 349/155–157
See application file for complete search history.

(56) References Cited

U.S. PATENT DOCUMENTS

| | | | | |
|---|---|---|---|---|
| 5,973,763 | A * | 10/1999 | Fujimura et al. | 349/156 |
| 6,067,141 | A * | 5/2000 | Yamada et al. | 349/129 |
| 6,115,098 | A * | 9/2000 | Kume et al. | 349/155 |
| 6,275,280 | B1 * | 8/2001 | Kajita et al. | 349/155 |
| 6,304,308 | B1 * | 10/2001 | Saito et al. | 349/155 |
| 6,317,188 | B1 * | 11/2001 | Shibahara | 349/155 |
| 6,433,852 | B1 * | 8/2002 | Sonoda et al. | 349/156 |
| 6,466,296 | B1 * | 10/2002 | Yamada et al. | 349/160 |
| 6,864,945 | B2 * | 3/2005 | Fujimori et al. | 349/156 |
| 7,133,110 | B2 * | 11/2006 | Sasaki et al. | 349/156 |
| 2005/0264750 | A1 * | 12/2005 | Andoh | 349/156 |

FOREIGN PATENT DOCUMENTS

CN  1558269 A  2/2004

OTHER PUBLICATIONS

First Office Action issued in corresponding Chinese Patent Application No. 2006100806969; issued Mar. 28, 2008.

* cited by examiner

*Primary Examiner*—Frank G Font
*Assistant Examiner*—Guy G Anderson
(74) *Attorney, Agent, or Firm*—Brinks Hofer Gilson & Lione

(57) ABSTRACT

A liquid crystal display (LCD) device is disclosed, which comprises a protrusion, and a column spacer being partially overlapped with the protrusion to thereby prevent a cell gap defect. The LCD device includes first and second substrates facing each other and gate and data line crossing each other to define a unit pixel region. In addition a thin film transistor formed adjacent to a crossing of the gate and data lines is included. The protrusions formed on the first substrate correspond with predetermined portions of the gate line. The column spacers are formed on the second substrate with a predetermined portion overlapped with some portion of one of the protrusions. A liquid crystal layer is formed between the first and second substrates.

18 Claims, 8 Drawing Sheets

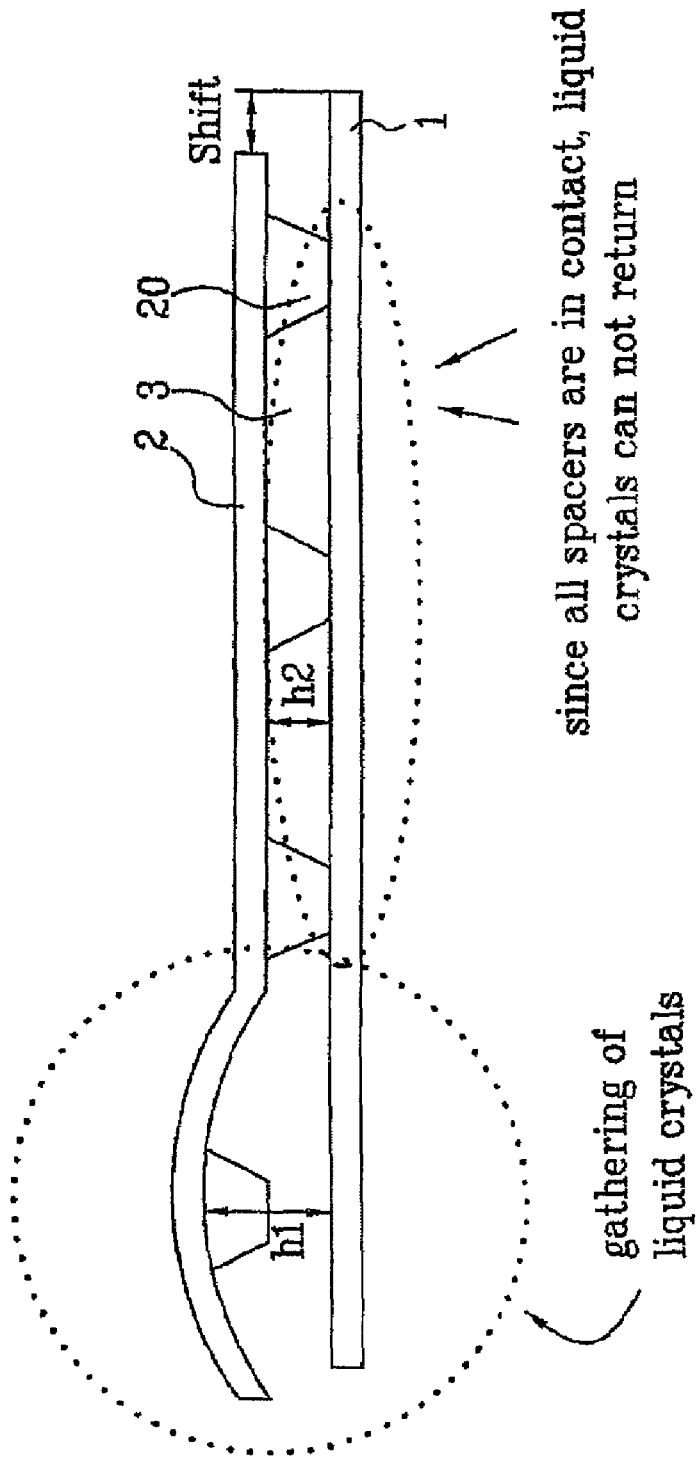

LIQUID CRYSTAL DISPLAY DEVICE

This application claims the benefit of the Korean Patent Application No. P2005-56120, filed on Jun. 28, 2005, which is hereby incorporated by reference as if fully set forth herein.

BACKGROUND

Discussion of the Related Art

Demands for various display devices have increased with development of an information society. Accordingly, many efforts have been made to research and develop various flat display devices such as liquid crystal display ("LCD"), plasma display panel ("PDP"), electroluminescent display ("ELD"), and vacuum fluorescent display ("VFD"). Some species of flat display devices have already been applied to displays for various equipment.

Among the various flat display devices, liquid crystal display ("LCD") devices have been most widely used due to their thin profile, light weight, and low power consumption, whereby the LCD devices may provide a substitute for a Cathode Ray Tube ("CRT"). In addition to mobile type LCD devices such as a display for a notebook computer, LCD devices have been developed for computer monitors and televisions to receive and display broadcasting signals.

Despite various technical developments in the LCD technology having applications in different fields, research in enhancing the picture quality of the LCD device has been, in some respects, slower as compared to other features and advantages of the LCD device. In order to use LCD devices in various environments as a general purpose display, a high quality picture may be required. High resolution and high luminance with a large-sized screen should be achieved, while still maintaining a light weight, thin profile, and low power consumption.

Generally, a related art LCD device includes first and second substrates bonded to each other at a predetermined interval, and a liquid crystal layer formed between the first and second substrates. Specifically, the first substrate includes a plurality of gate and data lines, a plurality of pixel electrodes, and a plurality of thin film transistors T. The plurality of gate lines are formed on the first substrate at fixed intervals, and the plurality of data lines are formed perpendicular to the plurality of gate lines at fixed intervals. The plurality of pixel electrodes, which are arranged in a matrix-type configuration, are respectively formed in pixel regions defined by the plurality of gate and data lines crossing each other. The plurality of thin film transistors T are formed adjacent to crossings of the gate and data lines, and are switched according to signals of the gate lines for transmitting signals of the data lines to the respective pixel electrodes.

The second substrate includes a black matrix layer that excludes light from regions except the pixel regions P of the first substrate, R/G/B color filter layer displaying various colors in correspondence with the pixel regions, and a common electrode to display the picture image. The liquid crystal layer is formed between the first and second substrates. The LCD device is driven according to an electric field generated between the pixel electrode and the common electrode. Thus, it is possible to control the amount of light passing through the liquid crystal layer according to the alignment of the liquid crystal layer, thereby displaying the images. This is referred to as a Twisted Nematic ("TN") mode, which has the disadvantage of a narrow viewing angle. In order to overcome the disadvantage of the TN mode LCD device, an In-Plane Switching ("IPS") mode LCD device has been developed.

In case of the IPS mode LCD device, both pixel and common electrodes are formed at a predetermined interval in a pixel region of a first substrate, thereby generating an IPS mode electric field (transverse electric field). That is, a liquid crystal layer is driven with the transverse electric field. Spacers are formed between the first and second substrates, so as to maintain the predetermined gap between the first and second substrates. The spacers are classified as either ball spacers or column spacers.

The ball spacers are formed in the shape of a sphere, and are scattered on the first or second substrate. Even after the attachment of the first and second substrates, the ball spacers may move freely, and the ball spacers have a small contact area with the first and second substrates.

Likewise, the column spacers are formed in an array process of the first or second substrate. The column spacers are fixedly formed in the shape of a column. Accordingly, the column spacers have a larger contact area with the first and second substrates as compared with the ball spacers.

FIG. 1 illustrates a cross sectional view of a related art LCD device having column spacers. As shown in FIG. 1, the LCD device having the column spacers is provided with first and second substrates 30 and 40 facing each other, the column spacers formed between the first and second substrates 30 and 40, and a liquid crystal layer (not shown) formed between the first and second substrates 30 and 40.

The first substrate 30 includes a plurality of gate lines 31 and data lines (not shown) crossing each other to define respective pixel regions. Also, each thin film transistor TFT is formed adjacent to the crossing area of the gate and data lines, and a pixel electrode (not shown) is formed in each of the pixel regions.

The second substrate 40 includes a black matrix layer 41 that excludes light from regions except the pixel regions P of the first substrate, R/G/B color filter layer 42 displaying various colors in correspondence with the pixel regions, and a common electrode or an overcoat layer 43 formed on an entire surface thereof.

The column spacer 20 is formed on the first substrate corresponding to a predetermined portion of the gate line 31. Also, a gate insulating layer 36 is formed on the surface of the first substrate 30 including the gate line 31, and a passivation layer 37 is formed on the gate insulating layer 36.

FIG. 2A illustrates a plan view of a touch defect generated in a related art LCD device having column spacers. FIG. 2B illustrates a cross sectional view of a touch defect generated in a related art LCD device having column spacers. As shown in FIG. 2A and FIG. 2B, if a surface of an LCD panel 10 having column spacer according to the related art is touched by hand or finger at a predetermined direction, spots are generated on the touched portion of the surface of the LCD panel 10. The spots are referred to as the touch defect.

In the case of an LCD device having column spacers as shown in FIG. 2B, the column spacers 20 are in contact with lower and upper substrates 1, 2. The contact between the column spacer and the substrate causes increased frictional force between the column spacers 20 and the two opposing substrates 1, 2. Thus, the liquid crystal molecules between the column spacers are not restored to the original state, thereby generating the spots on the screen. Also, when the LCD panel 10 is touched along a predetermined direction as shown in FIG. 2B, the liquid crystal molecules 3 gather to the region around the touch portion, thereby causing the region around the touch portion to protrude. In this case, a cell gap h1 corresponding to a protruding portion is higher than a cell gap h2 of the remaining portions, thereby generating light leakage. Accordingly, it is impossible to obtain the uniform luminance In the case of the LCD device having the column spacers, the column spacers have a large contact area with the opposing substrates, generating great friction. As shown in FIG. 2B, the column spacer 20 is in contact with the large area of the first substrate. Thus, after the first and second substrates are shifted by touch, it takes a long time to return to the original state of the opposing substrates, thereby causing the touch defect.

SUMMARY

Accordingly, the present disclosure is directed to a liquid crystal display ("LCD") device, which obviates one or more problems due to limitations or disadvantages of the related art.

In a first aspect, a liquid crystal device ("LCD") device includes a first substrate and a second substrate. The first substrate faces the second substrate. The LCD device further includes gate lines and data lines. The gate lines cross the data lines to define a unit pixel region, which is formed on the first substrate. A thin film transistor formed adjacent to the crossing of the gate lines and the data lines. Protrusions are formed on the first substrate corresponding to predetermined portions of at least one of the gate lines. Column spacers are formed on the second substrate with a predetermined portion overlapping with a portion in a corresponding one of the protrusions. The overlapped portions are variable. The LCD device further includes a liquid crystal layer formed between the first and second substrates.

In a second aspect, a liquid crystal display ("LCD") device includes a first substrate and a second substrate. The LCD device further includes gate and data lines crossing each other to define a unit pixel region, formed on the first substrate, a thin film transistor formed adjacent to a crossing of the gate and data lines, a plurality of protrusions formed on the first substrate corresponding to predetermined portions of the gate line, a plurality of column spacers formed on the second substrate, wherein each of the column spacers has a predetermined portion overlapped with some portion in each of the protrusions, and the overlapped portions are variable in position and a liquid crystal layer formed between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the principle of the disclosure. In the drawings:

FIG. 2B is a cross sectional view of illustrating a touch defect generated in a related art LCD device having column spacers;

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts. Hereinafter, an LCD device according to one embodiment of the present disclosure will be described with reference to the accompanying drawings.

Figure 5:
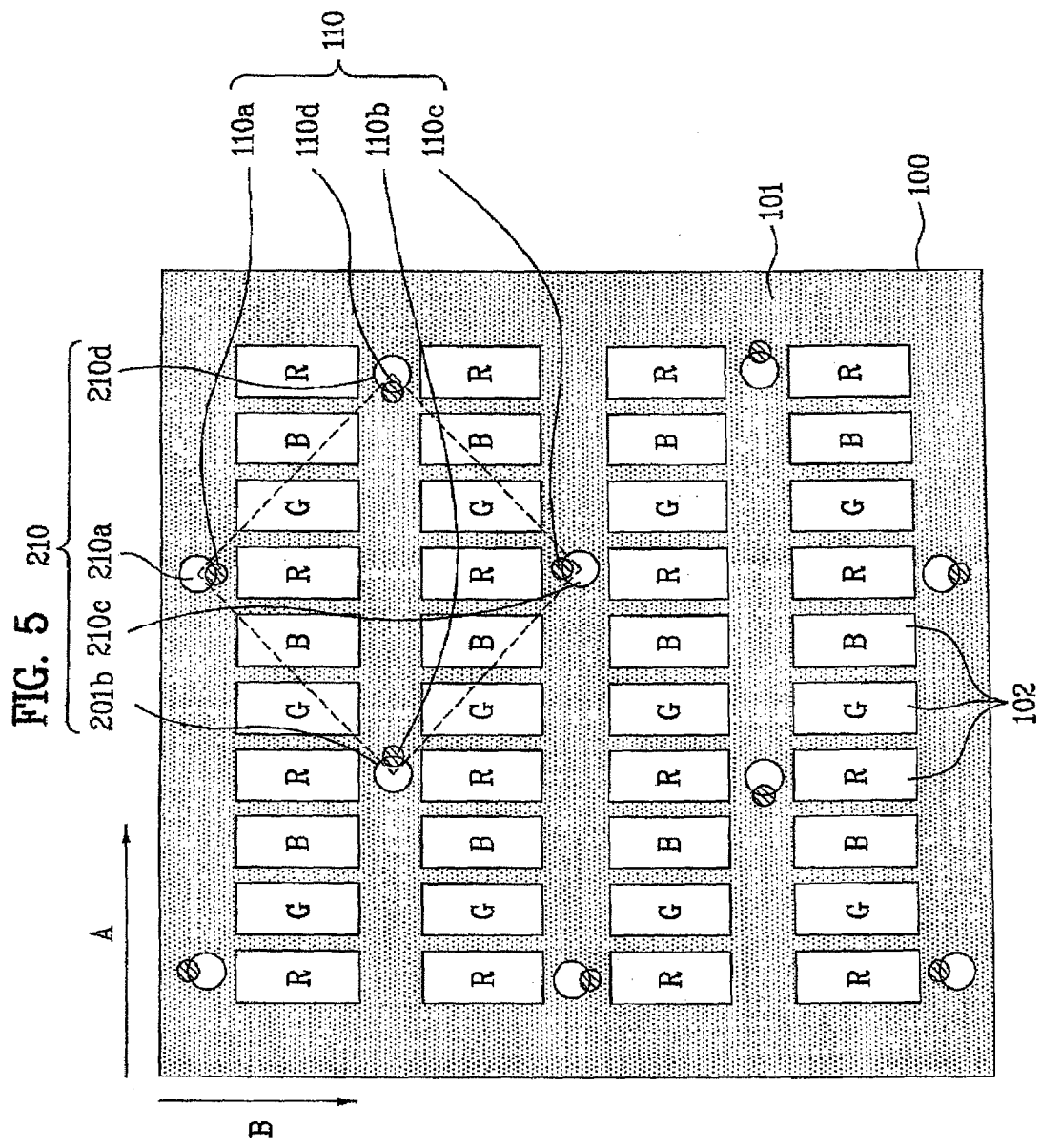
FIG. 5 is an illustration of a plan view of a relation between plurality of column spacers and a plurality of protrusions of an LCD device according to the present invention.

FIG. 5 is an illustration of a plan view of a relation between a plurality of column spacers and a plurality of protrusions of an LCD device according to the present invention. In an LCD device as shown in FIG. 5, a plurality of column spacers 110 are formed at fixed intervals on a first substrate 100, and a plurality of protrusions 210 are formed corresponding to the column spacers. Each protrusion 210 is partially overlapped with each column spacer 110. Also, the plurality of protrusions 210 of a similar size are formed at fixed intervals. Further, each protrusion 210 is formed in correspondence with a line formation portion. For example, a portion may be formed on a gate line, a data line or a common line. Specifically, in the embodiment shown in FIG. 5, the protrusions 210 are formed every six sub-pixels along the 'A' direction, and are formed every two sub-pixels along the 'B' direction.

Each protrusion 210 is formed corresponding to each column spacer 110. When the column spacers 110 are partially overlapped with the protrusions 210, the overlapped portions are variable in position. In this case, a total area of the overlapped portions between the column spacers 110 and the protrusions 210 corresponds to a total area of the overlapped portions between column spacers and protrusions shown in FIGS. 3 and 4.

For example, as shown in FIG. 5, when forming an imaginary diamond shape with the adjacent four protrusions 210a-210d, the four protrusions have the different portions overlapped with the column spacers 110a-110d. If the first protrusion 210a is positioned in the upper side of the imaginary diamond shape, the lower portion of the first protrusion 210a is overlapped with the first column spacer 110a. In the case of the second protrusion 210b which is positioned in the left side of the imaginary diamond shape, the right portion of the second protrusion 210b is overlapped with the second column spacer 110b. In the case of the third protrusion 210c which is positioned in the lower side of the imaginary diamond shape, the upper portion of the third protrusion 210c is overlapped with the third column spacer 110c. In the case of the fourth protrusion 210d which is positioned in the right side of the imaginary diamond shape, the left portion of the fourth protrusion 210d is overlapped with the fourth column spacer 110d.

Figure 6:
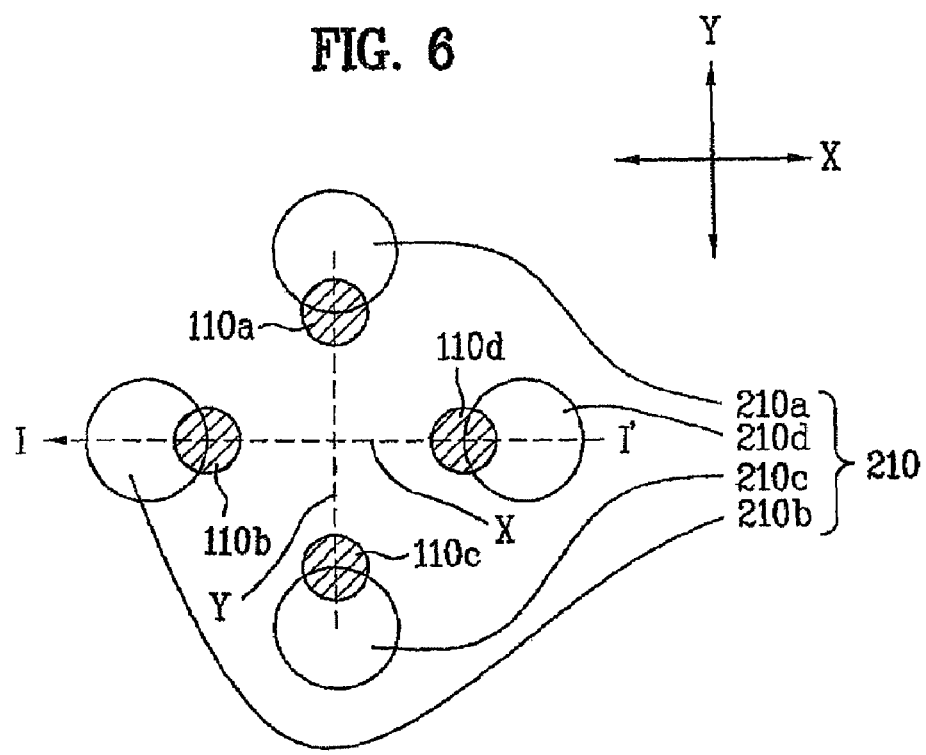
FIG. 6 is an illustration of a plan view of adjacent column spacers and corresponding protrusions of FIG. 5.

In another embodiment, the upper portion of the first protrusion 210a may be overlapped with the first column spacer 110a, the left portion of the second protrusion 210b may be overlapped with the second column spacer 110*b*, the lower portion of the third protrusion 210*c* may be overlapped with the third column spacer 110*c*, and the right portion of the fourth protrusion 210*d* is overlapped with the fourth column spacer 110*d*. Accordingly, the overlapped portions of two protrusions are located in opposing positions on the y axis and the overlapped portions of two protrusions are located in opposing positions on the x axis. As shown in FIG. 6 and will be discussed further below, protrusion 210*a* and protrusion 210*c* are located at opposing positions on the y axis and protrusions 210*b* and protrusion 210*d* are located at opposing positions on the x axis.

The first substrate 100 is comprised of a black matrix layer 101, a color filter layer 102, and an overcoat layer (not shown). The black matrix layer 101 is formed corresponding to the other portions except for the pixel regions (gate and data lines). The color filter layer 102 is formed on the first substrate 100 including the black matrix layer 101, and the overcoat layer (not shown) is formed above the black matrix layer 101 and the color filter layer 102. The column spacers 110 are formed on the overcoat layer (not shown) corresponding to the black matrix layer 101 of the first substrate 100.

Figure 7:
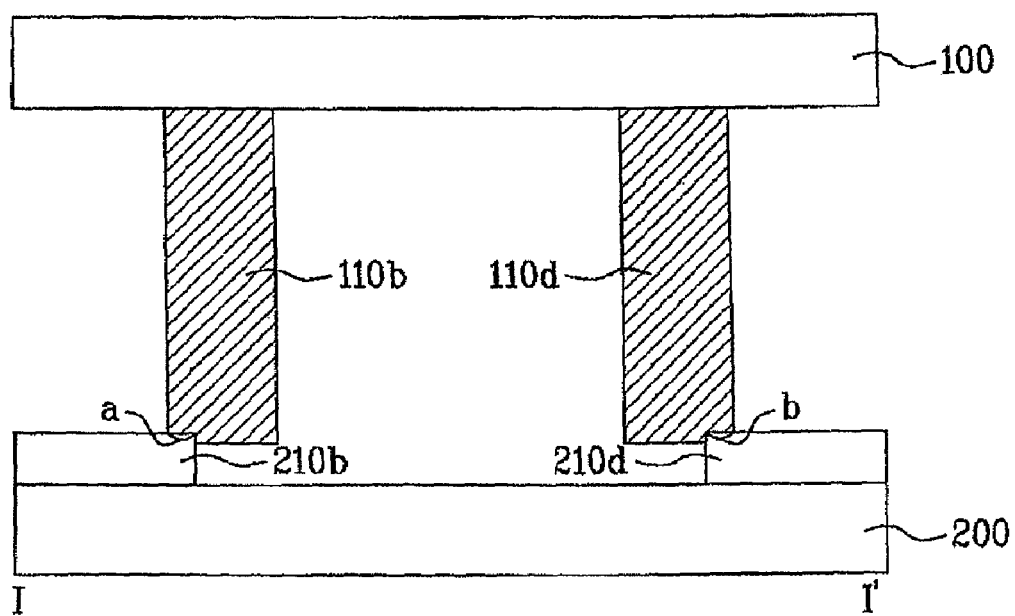
FIG. 7 is a cross sectional view along I-I' of FIG. 6.

FIG. 6 is an illustration of a plan view of adjacent column spacers and corresponding protrusions as shown in FIG. 5. FIG. 7 is a cross sectional view along I-I' of FIG. 6.

Referring to FIGS. 6 and 7, when providing a protrusion corresponding to the adjacent four column spacers, the opposite column spacers are in contact with the opposite portions of the respective protrusions. As shown in FIG. 6, in the case of the first and third protrusions 210*a* and 210*c* which are positioned opposite to each other along the y axis, the lower portion of the first protrusion 210*a* is overlapped with the upper portion of the first column spacer 110*a*, and the upper portion of the third protrusion 210*c* is overlapped with the lower portion of the third column spacer 110*c*. Also, in the case of the second and fourth protrusions 210*b* and 210*d* which are positioned opposite to each other along the x axis, the right portion of the second protrusion 210*b* is overlapped with the left portion of the second column spacer 110*b*, and the left portion of the fourth protrusion 210*d* is overlapped with the right portion of the fourth column spacer 110*d*. This embodiment will be further described in relation to FIG. 7.

FIG. 7 is a cross sectional view along I-I' of FIG. 6. Two column spacers 110*b*, 110*d*, are shown overlapping two protrusions 210*b*, 210*d*, respectively between a first substrate 100 and a second substrate 200. The second column spacer 110*b* is overlapped with the second protrusion 210*b* at a width 'a', and the fourth column spacer 110*d* is overlapped with the fourth protrusion 210*d* at a width 'b'. FIG. 7 illustrates one embodiment for the overlap of a column spacer with a protrusion. The overlap may be varied in alternate embodiments.

As shown in the embodiment of FIG. 7, protrusion 210*b* prevents the column spacer 110*b* from being shifted to the left on the x axis. Likewise, protrusion 210*d* prevents the column spacer 110*d* from being shifted to the right on the x axis. Likewise, protrusion 210*a* prevents column spacer 110*a* from being shifted upwards on the y axis and protrusion 210*c* prevents column spacer 110*c* from being shifted downwards along the y axis. This embodiment with four column spacers and corresponding protrusions prevents shifting of the column spacers in both the x and y axes, which thereby reduces the touch defect.

In this embodiment, value 'a' is the distance of contact between the column spacer 110*b* and the protrusion 210*b*. Value 'b' is the distance of contact between the column spacer 110*d* and the protrusion 210*d*. The values of 'a' and 'b' are smaller than the width of the protrusions 210. The width of the protrusion is also referred to as the critical value. Because the values of 'a' and 'b' are less than the critical value, the frictional force between the column spacer and the protrusion is reduced, thereby facilitating the easy return of the column spacer back to its original position.

Figure 8:
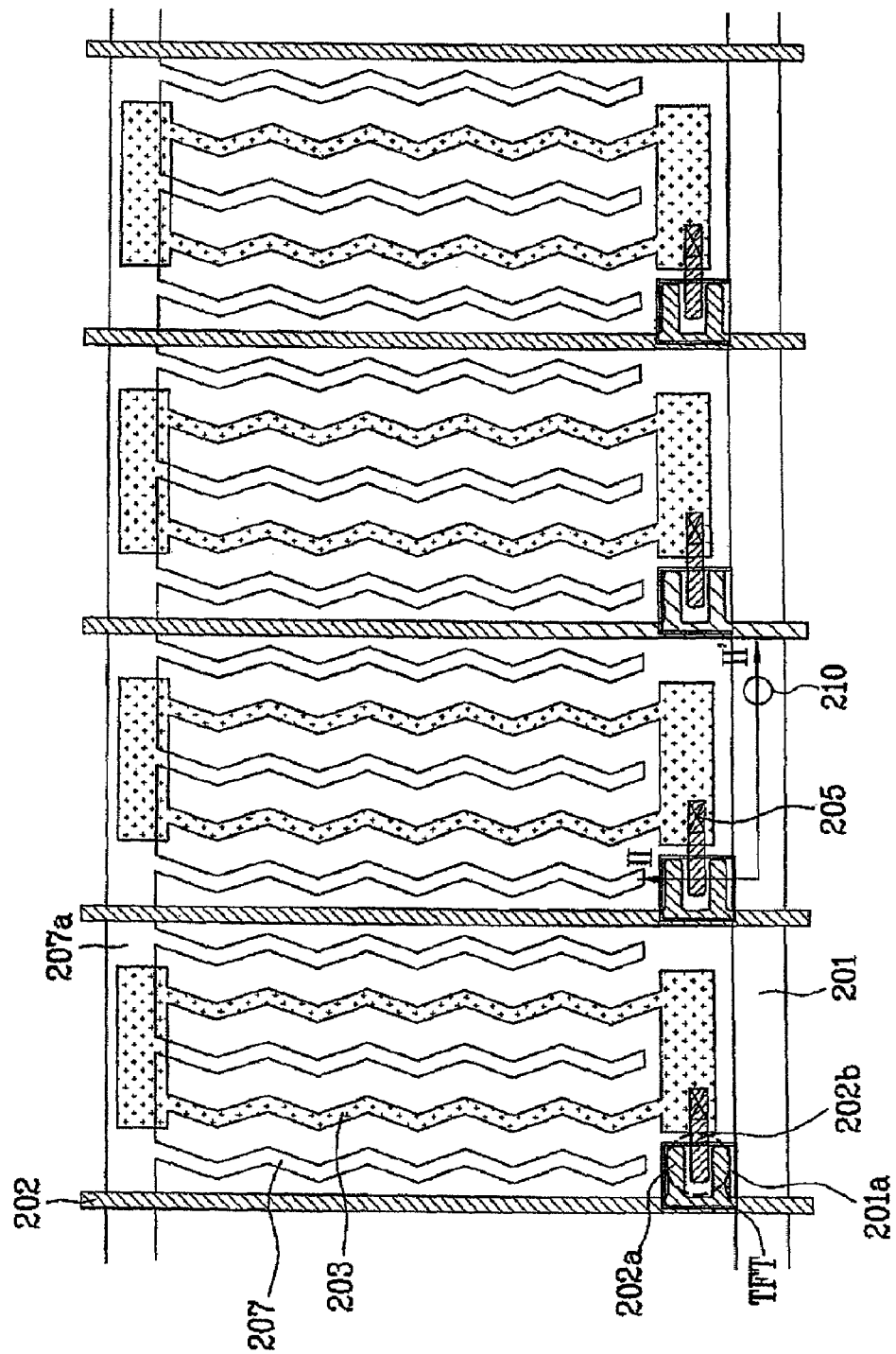
FIG. 8 is an illustration of a plan view of an IPS mode LCD device according to one embodiment.
Figure 9:
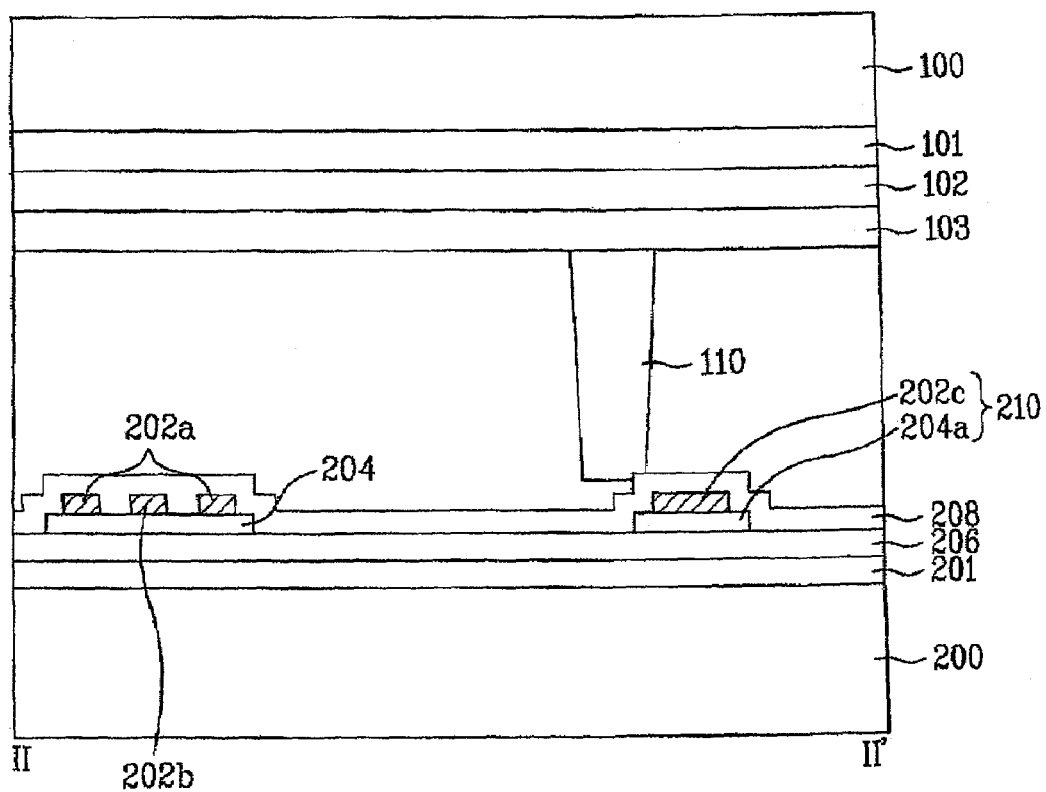
FIG. 9 is a cross sectional view along II-II' of FIG. 8.

FIG. 8 is an illustration of a plan view of an In-Plane Switching ("IPS") mode LCD device according to one embodiment. FIG. 9 is a cross sectional view along II-II' of FIG. 8.

An LCD device disclosed FIGS. 8 and 9 is one embodiment to apply the IPS mode to the structure of FIGS. 5-7. As shown in FIGS. 8-9 the LCD device is comprised of a first substrate 100, a second substrate 200, a plurality of protrusions 210, and a plurality of column spacers 110. As shown in FIG. 9, the first substrate 100 is opposite to the second substrate 200. Also, the plurality of protrusions 210 are formed on predetermined portions of the second substrate 200. The plurality of column spacers 110 are formed on the first substrate 100, and each of the column spacers 110 corresponding to each of the protrusions 210 is partially overlapped with each of the protrusions 210.

As shown in FIGS. 8 and 9, the second substrate 200 includes a gate line 201 having a gate electrode 201*a*, a gate insulating layer 206, a semiconductor layer (not shown), a data line 202, a thin film transistor TFT, a passivation layer 208, a pixel electrode 203, and a common electrode 207. The gate insulating layer 206 is formed on an entire surface of the second substrate 200 including the gate line 201, and the semiconductor layer (not shown) covering the gate electrode 201*a* is formed on the gate insulating layer 206. The data line 202 having a source electrode 202*a* is formed perpendicular to the gate line 201 on the gate insulating layer 206. The thin film transistor TFT is formed adjacent to a crossing of the gate and data lines 201 and 202. The passivation layer 208 is formed on the surface of the second substrate 200 including the data line 202. The pixel electrode 203 and the common electrode 207 are alternately formed on pixel regions of the passivation layer 208. The common electrode 207 is extending from a common line 207*a* being adjacent to the gate line 201.

Referring to FIG. 8, a thin film transistor TFT is comprised of the gate electrode 201*a* protruding from the gate line 201, the source electrode 202*a* of 'U' shape protruding from the data line 202, a drain electrode 202*b* formed at a predetermined interval from the source electrode 202*a* and partially positioned inside the 'U' shape of the source electrode 202*a*, and the semiconductor layer formed above the gate electrode 201*a* and overlapped with the source and drain electrodes 202*a* and 202*b*. The semiconductor layer may be formed in a deposition structure comprising an amorphous silicon layer and an impurity layer, wherein the impurity layer of the semiconductor layer is partially removed corresponding to a portion between the source and drain electrodes 202*a* and 202*b*. As explained above, the source electrode 202*a* may be formed in shape of 'U', or in shape of '-'. If the source electrode 202*a* is formed in a 'U' shape, it is possible to improve the efficiency of thin film transistor by increasing a channel area.

As shown in FIG. 9, the LCD device according to one embodiment has a plurality of protrusions 210 provided on the predetermined portions corresponding to the gate line 201. Each of the protrusions 210 may be formed in a single layer structure of a semiconductor layer pattern or a source/drain electrode layer, or may be formed in a deposition layer structure of the semiconductor layer pattern and the source/drain electrode layer. The semiconductor layer pattern 204*a* may be formed of a semiconductor layer material (deposition of amorphous silicon layer and impurity layer) when patterning the semiconductor layer 204, and the source/drain electrode layer 202c may be formed of a metal material when patterning the data line 202 and the source/drain electrodes 202a/202b. Accordingly, since the protrusion 210 is formed of the semiconductor pattern 204a or the source/drain electrode layer 202c, the protrusion 210 is positioned above the gate insulating layer 206 and below the passivation layer 208.

Referring to FIG. 8, contact portion 205 corresponds to a contact portion between the drain electrode 202b and the pixel electrode 203, from which the predetermined portion of the drain electrode 202b is exposed by removing the gate insulating layer 206 and the passivation layer 208.

Referring to FIG. 9, the first substrate 100 may include a black matrix layer 101, a color filter layer 102, and an overcoat layer 103. The black matrix layer 101 is formed in a shape of shielding the other portions except the pixel regions (corresponding to the gate and data lines) and the thin film transistors ("TFTs"). The color filter layer 102 is formed on the first substrate 100 including the black matrix layer 101, wherein the color filter layer is positioned in correspondence with the pixel regions. The overcoat layer 103 is formed on an entire surface of the first substrate 100 including the black matrix layer 101 and the color filter layer 102. The plurality of column spacers 110 may be formed over the first substrate 100, and each of the column spacers 110 corresponding to each of the protrusions 210 is partially overlapped with one of the protrusions 210 formed on the second substrate 200.

The embodiment shown in FIG. 8 is formed in an In-Plane Switching ("IPS") mode. Alternatively, the above structure of partially overlapping the column spacers and the protrusions may be applied to a Twisted Nematic ("TN") mode. In the TN mode LCD device, a pixel electrode is formed in a unit pixel region on a second substrate, and a common electrode is formed on a surface of a first substrate. However, the TN mode LCD device is similar in structure to the IPS mode LCD device. In the TN mode LCD device, the plurality of protrusions 210 are formed corresponding to the plurality of column spacers 110, and each of the protrusions 210 is partially overlapped with each of the column spacers 110.

Figure 1:
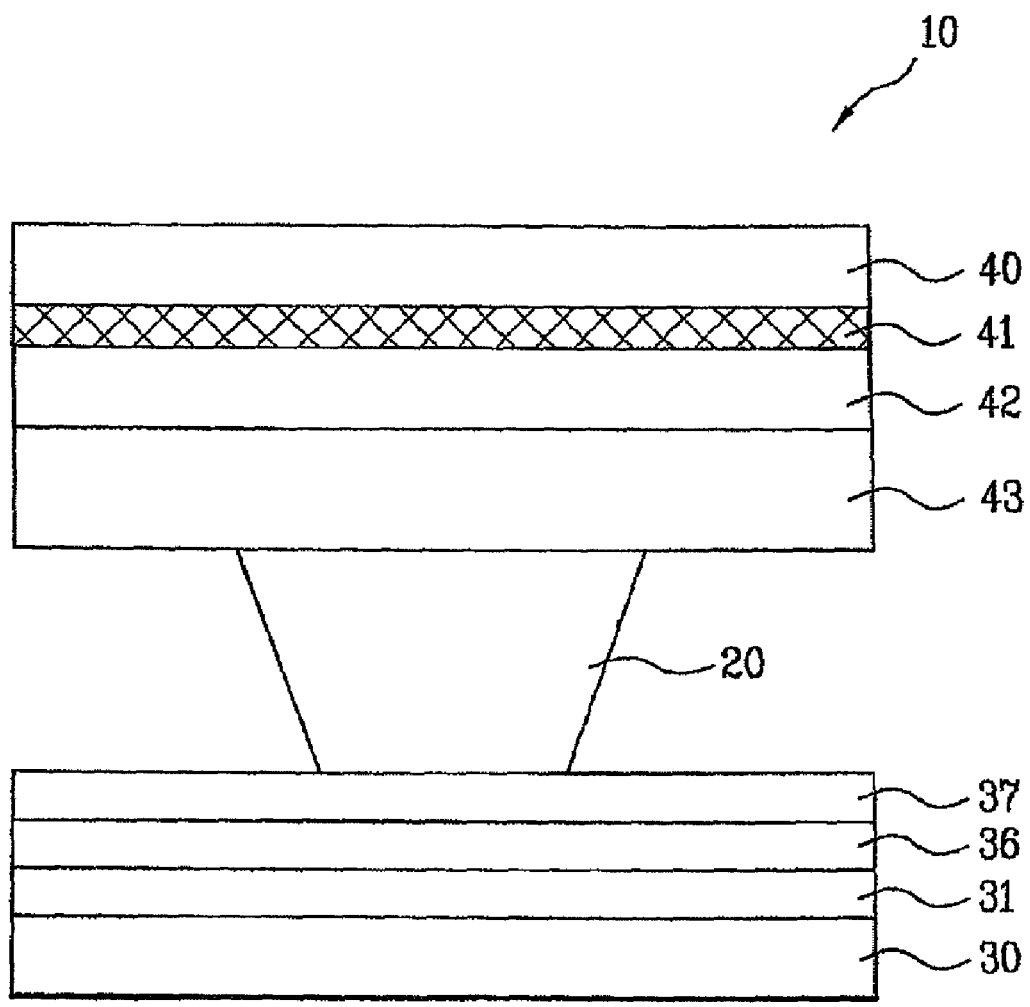
FIG. 1 is a cross sectional view of illustrating an LCD device having column spacers according to the related art.
Figure 2A:
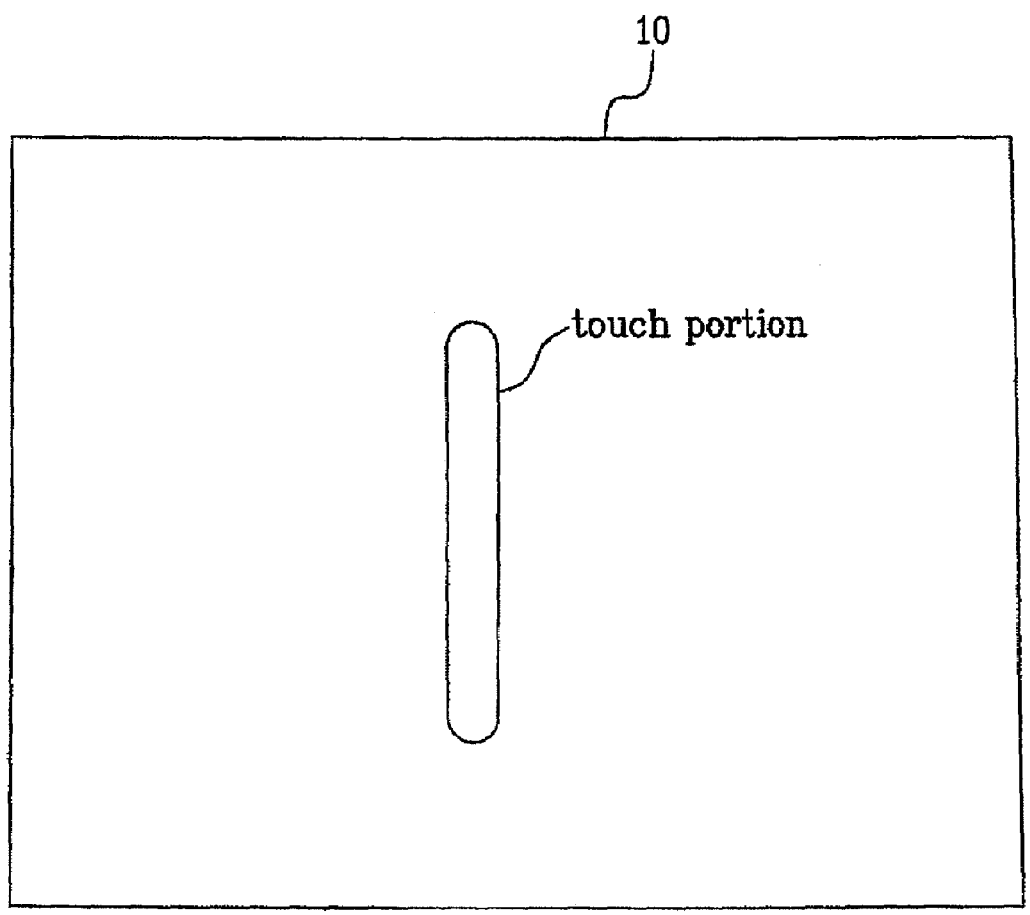
FIG. 2A is a plan view illustrating a touch defect generated in a related art LCD device having column spacers.
Figure 3:
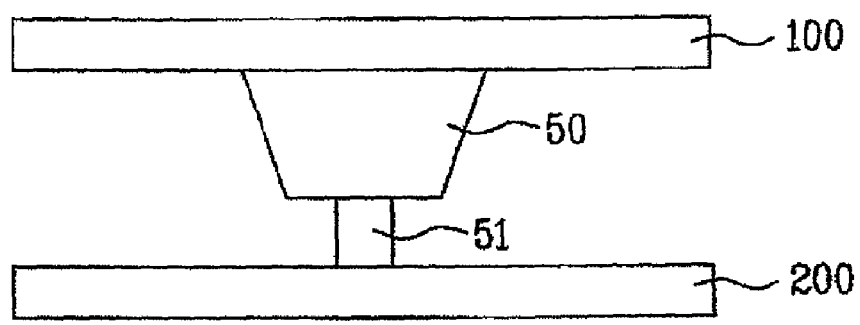
FIG. 3 is an illustration of a cross sectional view of an LCD device having a protrusion.
Figure 4:
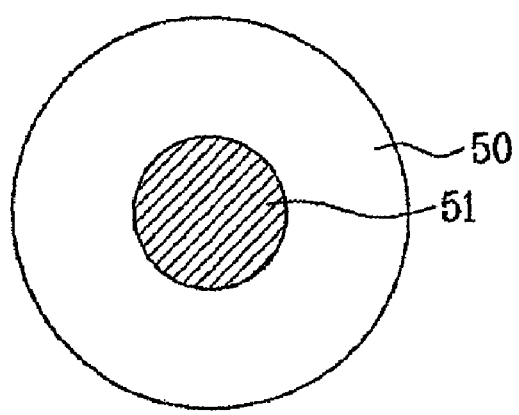
FIG. 4 is an illustration of a plan view of a column spacer and a corresponding protrusion of FIG. 3.

Referring to FIGS. 3 and 4, when the protrusion 51 is overlapped with the central portion of the column spacer 50, the pressing force is focused on the central portion of the column spacer 50, to thereby cause the deformation of the column spacer 50. Also, the protrusion 51 has a small size of a critical value, about 6 μm or less, so that it is difficult to uniformly form the protrusions when patterning. Thus, it may generate the variation on pressing the column spacers. In this case, a viewer can feel this variation upon pressing the column spacers.

In the LCD device according to an embodiment, the protrusion 51 has an increasing critical value of about 10 μl, and each protrusion 51 is partially overlapped with each column spacer 50. Accordingly, even though the protrusion 51 increases in size, the contact area between the protrusion 51 and the column spacer 50 is similar to that of the general protrusion structure, thereby preventing the touch defect. Also, since the predetermined portion of the protrusion 51 is partially overlapped with the column spacer 50, the pressing force applied to the column spacer 50 is decreased owing to the division of force, to thereby minimize the deformation of the column spacer 50.

The contact area between the protrusion 51 and the column spacer 50 in the case of partially overlapping the predetermined portion of the protrusion with the column spacer is similar to that in the case of overlapping the protrusion with the central portion of the column spacer. In consideration of a bonding margin, the overlapped width between the protrusion 51 and the column spacer 50 is larger than the bonding margin. Thus, even though there is a misalignment, the protrusion 51 is partially overlapped with the column spacer 50.

In the structure of FIGS. 3 and 4, the protrusion 51 may have the small size of the critical value below 6 μm when overlapping with the central portion of the column spacer 50, so that it is difficult to establish a uniform pattern due to the resolution margin. In the structure of partially overlapping the predetermined portion of the protrusion with the column spacer (as in FIGS. 5-9), the protrusion may be formed in the critical value corresponding to or larger than the resolution of photo-process. Accordingly, it is possible to control the uniformity in size of the protrusions, to thereby improve the picture quality by minimizing the deformation of the column spacers and the cell gap defect.

In the LCD device according to the present embodiments, each protrusion increases in size, and the overlapped portion between the protrusion and the column spacer is uniform, to thereby minimize the deformation of the column spacer and the cell gap defect. Specifically, the predetermined portion of the protrusion is partially overlapped with the predetermined portion of the column spacer, thereby decreasing the pressing power applied to the column spacer.

If the cell gap is not uniform, especially, the cell gap defect of the adjacent portions is large, the picture quality is deteriorated. In the LCD device according to the present embodiments, the deformation of the column spacer is minimized owing to the decrease in pressing force applied to the column spacer, to thereby maintain the uniform cell gap in the entire panel of the LCD device.

Furthermore, if an external shifting force by touch is applied to any one of the first and second substrates, the shift will be resisted by conformations of column spacers and protrusions. Based on the conformations at different edges of the corresponding column spacers on the respective protrusions, a shift between substrates will not occur, thereby preventing a touch defect.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal device ("LCD") device comprising:
   a first substrate and a second substrate, the first substrate facing the second substrate;
   gate lines and data lines, the gate lines crossing the data lines to define a unit pixel region, formed on the first substrate;
   a thin film transistor formed adjacent to a crossing of the gate lines and the data lines;
   protrusions formed on the first substrate;
   column spacers formed on the second substrate, wherein each of the column spacers is arranged in one-to-one correspondence with each of the protrusions and each column spacer has a contacted portion with a portion of an upper surface and a portion of a side surface of the corresponding one of the protrusions; and
   a liquid crystal layer formed between the first and second substrates.

2. The LCD device of claim 1, wherein the at least one column spacer fits onto a corner of the corresponding protrusion.

3. The LCD device of claim 1, wherein the total contacted portions between two of the column spacers and the corresponding protrusions are smaller than the upper surface of one of the protrusions.

4. The LCD device of claim 1, wherein the protrusions are nearly equal in size.

5. The LCD device of claim 1, wherein the column spacers are nearly equal in size.

6. The LCD device of claim 1, wherein four of the column spacers are adjacent one another and each of the four adjacent column spacers is partially overlapped with the lower, upper, left and right portions as a plan view, respectively, with four of the corresponding protrusions.

7. The LCD device of claim 1, wherein each corresponding surface of the column spacers being in contact with the second substrate is shaped as a circle or a polygon.

8. The LCD device of claim 1, wherein each corresponding surface of the protrusions being in contact with the first substrate is shaped as a circle or a polygon.

9. The LCD device of claim 1, wherein the thin film transistor comprises:
   a gate electrode protruding from the gate line;
   a source electrode protruding from the data line;
   a drain electrode formed in the same layer as the source electrode and formed at a predetermined interval from the source electrode; and
   a semiconductor layer formed above the gate electrode and partially overlapped with the source electrode and the drain electrode.

10. The LCD device of claim 9, wherein the protrusion comprises a semiconductor layer pattern formed in the same layer as the semiconductor layer, and a source/drain electrode layer formed on the semiconductor layer pattern in the same layer as the source electrode and the drain electrode.

11. An LCD device comprising: first and second substrates facing each other; gate and data lines crossing each other to define a unit pixel region, formed on the first substrate; a thin film transistor formed adjacent to a crossing of the gate and data lines; a plurality of protrusions formed on the first substrate corresponding to predetermined portions of the gate lines; a plurality of column spacers formed on the second substrate, wherein each of the plurality of column spacers is arranged in one-to-one correspondence with each of the plurality of protrusions and each of the column spacers has a predetermined portion overlapped with some portion of one of the protrusions, and the overlapped portions are different from each other; and a liquid crystal layer formed between the first and second substrates.

12. The LCD device of claim 11, wherein the plurality of protrusions are formed in the same size.

13. The LCD device of claim 11, wherein the plurality of column spacers are formed in the same size.

14. The LCD device of claim 11, wherein the adjacent four column spacers are partially overlapped with different portion of the corresponding protrusions, respectively.

15. The LCD device of claim 11, wherein each corresponding surface of the column spacers being in contact with the second substrate is formed in any shape of a circle and a polygon.

16. The LCD device of claim 11, wherein each corresponding surface of the protrusions being in contact with the first substrate is formed in any shape of a circle and a polygon.

17. The LCD device of claim 11, wherein each of the column spacer hangs over an edge of the corresponding protrusion.

18. The LCD device of claim 11, wherein the overlapping occurs such that a side of each column spacer contacts a side of the corresponding protrusion.

* * * * *

UNITED STATES PATENT AND TRADEMARK OFFICE
CERTIFICATE OF CORRECTION

PATENT NO. : 7,623,212 B2  
APPLICATION NO. : 11/409118  
DATED : November 24, 2009  
INVENTOR(S) : Jae Kyun Lee Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Twenty-sixth Day of October, 2010

David J. Kappos  
*Director of the United States Patent and Trademark Office*